(12) United States Patent
Martin et al.

(10) Patent No.: US 6,962,194 B2
(45) Date of Patent: Nov. 8, 2005

(54) BRAZED SHEETS WITH ALIGNED OPENINGS AND HEAT EXCHANGER FORMED THEREFROM

(75) Inventors: Michael Martin, Oakville (CA); Tim Miller, Burlington (CA)

(73) Assignee: DANA Canada Corporation, Oakville (CA)

( * ) Notice: Subject to any disclaimer, the term of this patent is extended or adjusted under 35 U.S.C. 154(b) by 0 days.

(21) Appl. No.: 10/724,436

(22) Filed: Nov. 28, 2003

(65) Prior Publication Data

US 2005/0115700 A1 Jun. 2, 2005

(51) Int. Cl.[7] ................................. F28F 3/12
(52) U.S. Cl. .................... 165/170; 29/890.039; 165/81
(58) Field of Search ............... 165/170, 81; 29/890.039

(56) References Cited

U.S. PATENT DOCUMENTS

| | | |
|---|---|---|
| 2,582,358 A | 1/1952 | Schoellerman |
| 3,141,500 A | 7/1964 | Raskin |
| 4,361,184 A | 11/1982 | Bengtsson |
| 4,615,129 A | 10/1986 | Jackson |
| 4,646,815 A | 3/1987 | Iwata |
| 5,009,557 A | 4/1991 | Dessirier |
| 5,129,473 A | 7/1992 | Boyer |
| 5,152,255 A | 10/1992 | Fukuda |
| 5,174,258 A | 12/1992 | Tanaka |
| 5,228,511 A * | 7/1993 | Boquel et al. ............... 165/81 |
| 5,251,718 A | 10/1993 | Inagawa |
| 5,273,386 A | 12/1993 | Luhm |
| 5,517,757 A | 5/1996 | Hayashi et al. |
| 5,586,614 A | 12/1996 | Kouchi et al. |
| 5,787,613 A | 8/1998 | Derome |
| 5,918,664 A * | 7/1999 | Torigoe ...................... 165/78 |
| 5,957,230 A | 9/1999 | Harano et al. |
| 5,979,542 A * | 11/1999 | Inoue et al. ................ 165/133 |
| 5,984,000 A | 11/1999 | Nakamura et al. |
| 5,992,552 A | 11/1999 | Eto |
| 6,098,706 A | 8/2000 | Urch |
| 6,109,217 A | 8/2000 | Hedlund |
| 6,227,290 B1 * | 5/2001 | Nishishita et al. .......... 165/174 |
| 6,241,011 B1 | 6/2001 | Nakamura et al. |
| 6,293,338 B1 | 9/2001 | Chapman et al. |
| 6,340,053 B1 | 1/2002 | Wu et al. |
| 6,438,840 B2 * | 8/2002 | Tavi et al. ............. 29/890.039 |
| 6,843,512 B2 | 1/2005 | Fritze et al. .............. 285/322 |

* cited by examiner

*Primary Examiner*—Teresa J. Walberg
(74) *Attorney, Agent, or Firm*—Ridout & Maybee LLP

(57) ABSTRACT

A pair of brazed sheets or plates having abutting portions through which aligned openings are formed, the opening through one sheet being larger than the opening through the other.

23 Claims, 7 Drawing Sheets

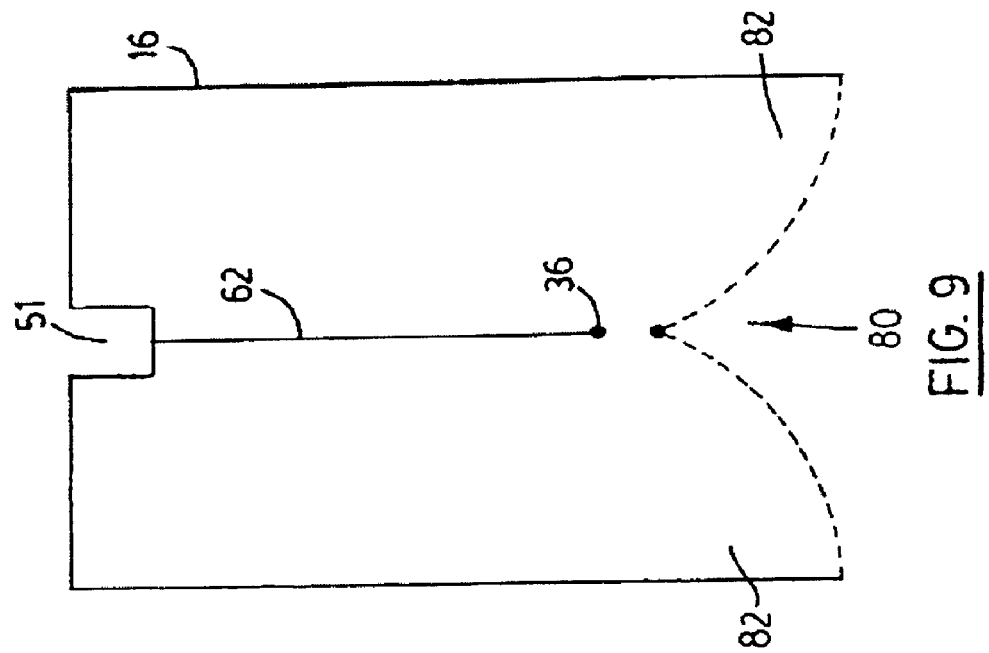
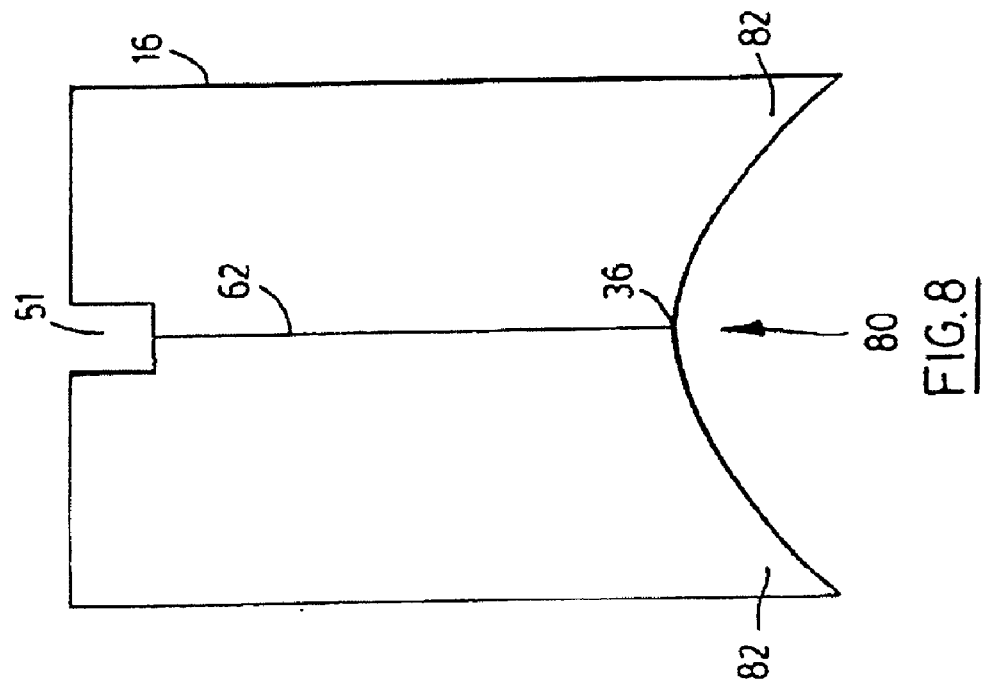

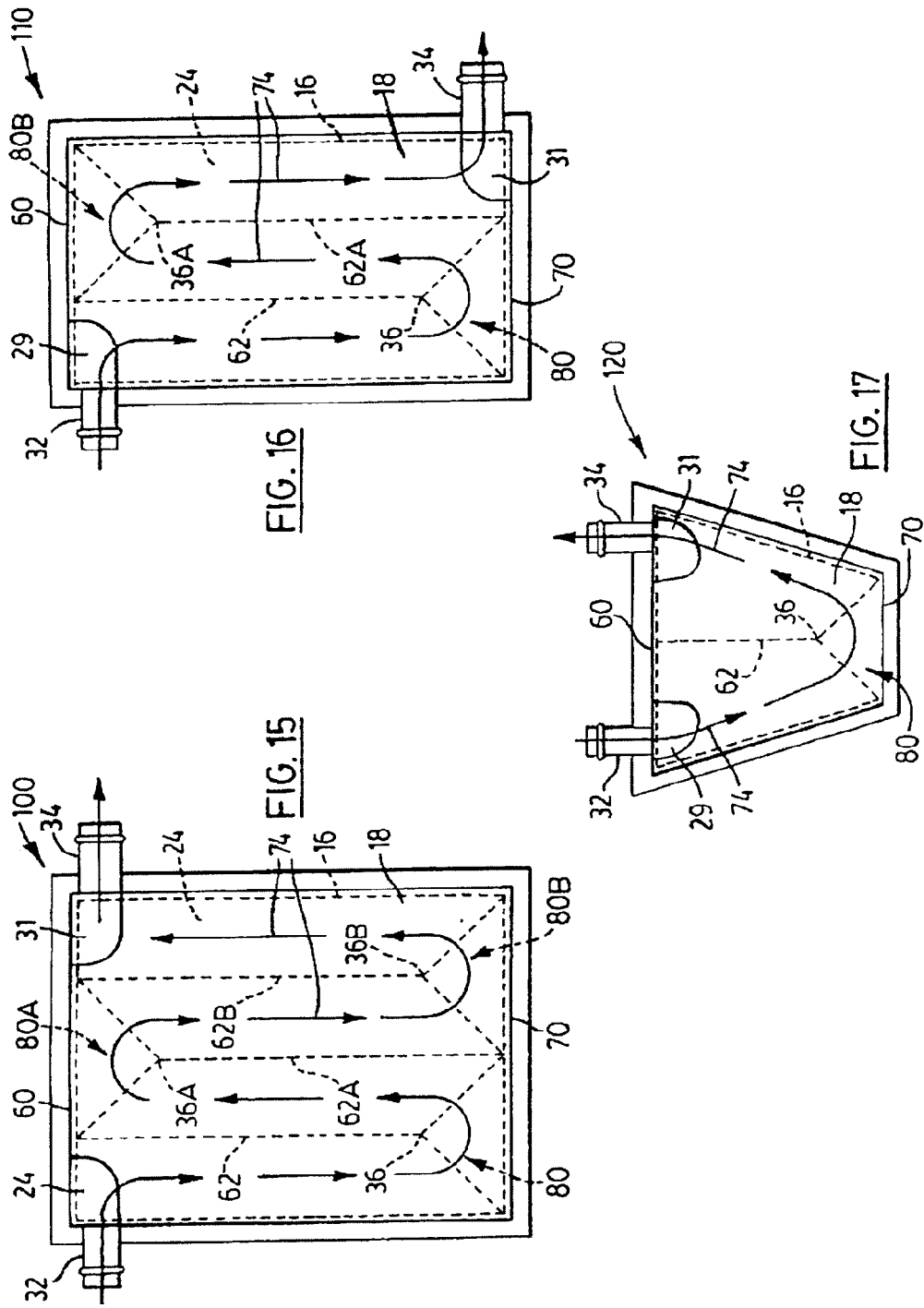

BRAZED SHEETS WITH ALIGNED OPENINGS AND HEAT EXCHANGER FORMED THEREFROM

BACKGROUND OF THE INVENTION

The present invention relates to brazed sheets having aligned openings and methods of forming same.

In various applications where components are formed from two metal sheets or plates, for example in the making of heat exchangers formed from two plates, it is sometimes desirable to form aligned openings through abutting plates to provide for mounting holes and the like. There is a need, particularly in the context of brazed sheet components, to provide a component made from two sheets that are joined together with aligned openings where the resulting hole formed from the aligned openings has a predictable effective size and is relatively tolerant to variations that may occur during manufacturing. There is also a need for a method for providing such a component.

SUMMARY OF THE INVENTION

According to example embodiments, a pair of brazed sheets or plates having abutting portions through which aligned openings are formed, the opening through one sheet being larger than the opening through the other.

According to an example of the present invention, a plate pair for use in a heat exchanger comprises a first plate having a first opening through a first plate portion thereof, a second plate having a second opening through a second plate portion thereof, the second opening being larger than the first opening, and braze material securing the first plate portion to the second plate portion with the first and second openings in substantial alignment with each other and together forming a fastener opening capable of receiving a fastener for mounting purposes.

According to another example of the invention, a method of forming a plate pair for use in a heat exchanger includes: (a) providing a first plate having a substantially planar central portion surrounded by a first peripheral edge portion, the first peripheral edge portion including a substantially planar peripheral flange section having a first opening formed therein (b) providing a second plate having a second peripheral edge portion having a second opening through said second edge portion, one of the first and second openings being larger than the other of the first and second openings, at least one of the first plate and second plate being covered with a brazing material; and (c) oven brazing the first plate and the second plate together with the first plate perinheral flange section abutting against the second peripheral edge portion and the first and second openings substantially in alignment with each other, the substantially aligned first and second openings together forming a mounting opening for receiving a fastener for mounting the heat exchanger.

BRIEF DESCRIPTION OF THE DRAWINGS

Example embodiments of the present invention will be described, by way of example with reference to the following drawings.

FIG. 8 is a diagrammatic plan view of an alternative turbulizer plate configuration for the heat exchanger of FIG. 1;

FIG. 9 is a diagrammatic plan view of a further alternative turbulizer plate configuration for the heat exchanger of FIG. 1;

FIG. 15 is a plan view of a heat exchanger according to another example embodiment;

FIG. 16 is a plan view of a heat exchanger according to a further example embodiment; and FIG. 17 is a plan view of a heat exchanger according to yet another example embodiment.

DESCRIPTION OF THE PREFERRED EMBODIMENTS

Figure 1:
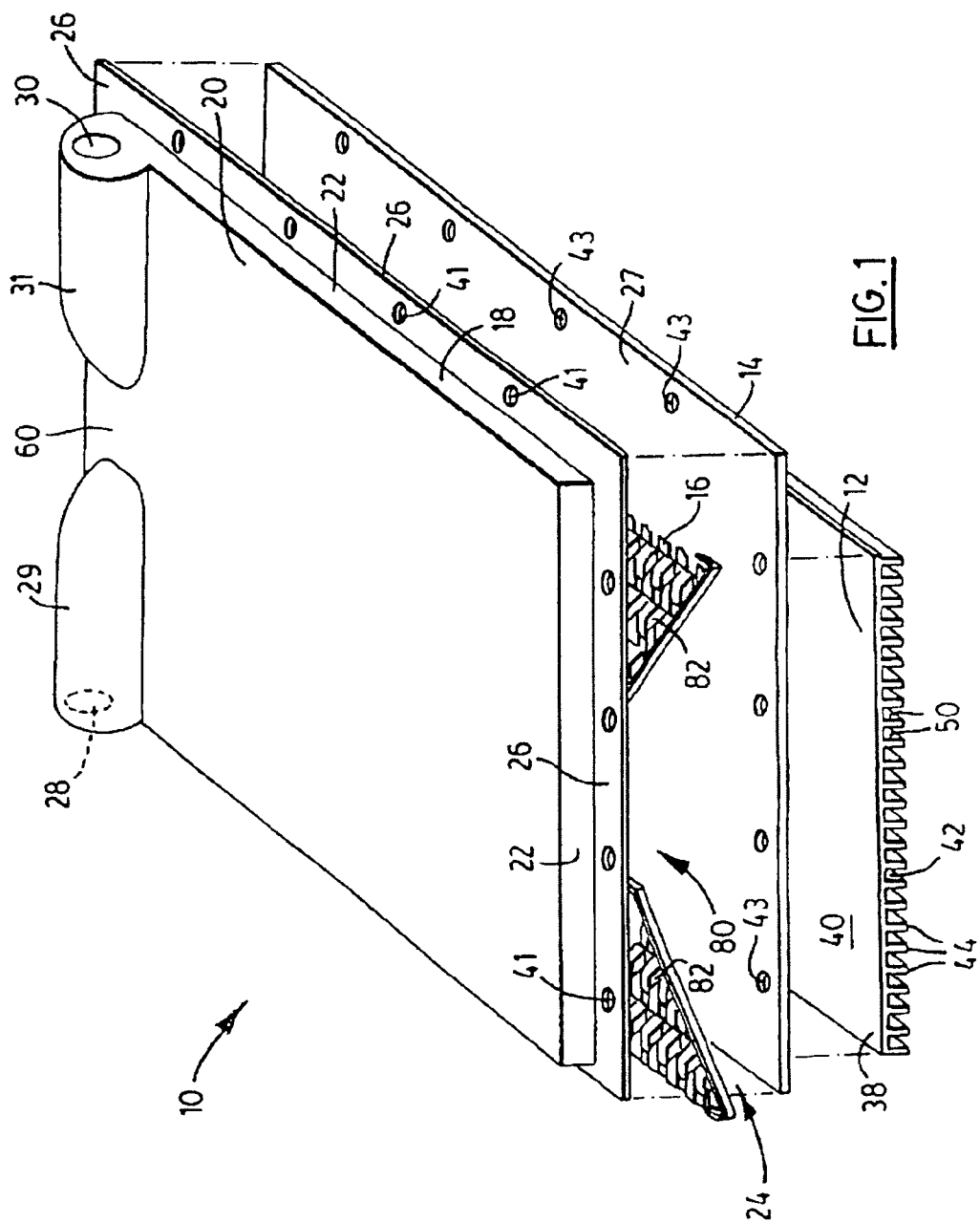
FIG. 1 is an exploded perspective view of a heat exchanger according to an example embodiment of the invention.

With reference to FIG. 1, there is shown an exploded view of a heat exchanger, indicated generally by reference numeral 10, according to an example embodiment of the invention. The heat exchanger 10 includes a base plate 14, a turbulizer plate 16, and a cover plate 18. In various embodiments, the heat exchanger 10 may also include a fin plate 12. The plates are shown vertically arranged in FIG. 1, but this is for the purposes of explanation only. The heat exchanger can have any orientation desired.

Figure 2:
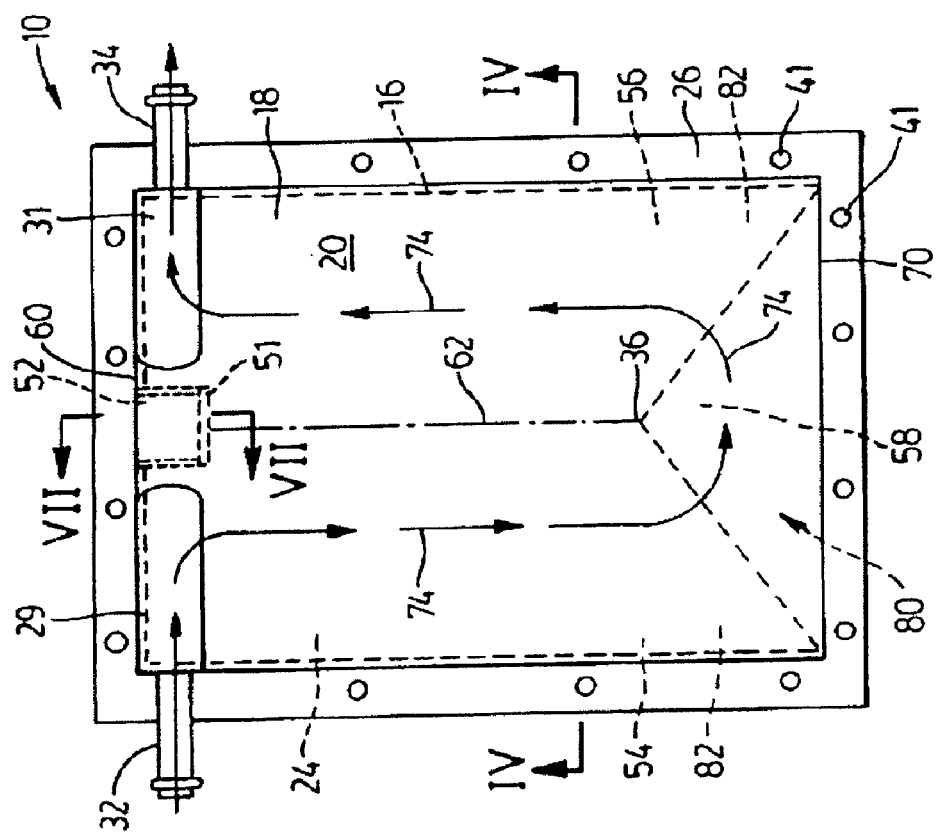
FIG. 2 is a plan view of the heat exchanger of FIG. 1.
Figure 4:
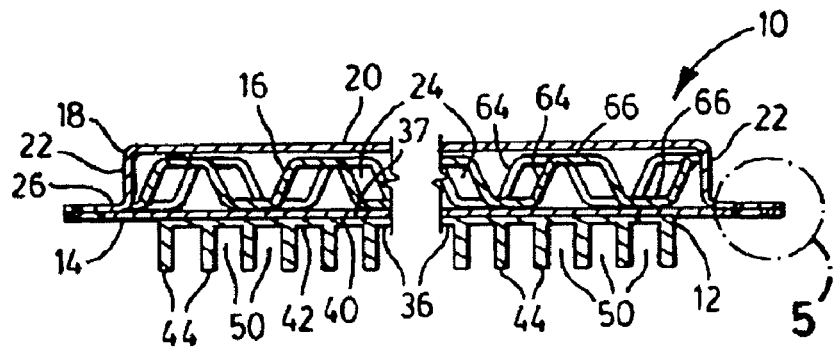
FIG. 4 is a sectional view taken along the lines IV—IV of FIG. 2.

Referring to FIGS. 1, 2 and 4, the cover plate 18 together with the base plate 14 define a flattened, low profile container having an internal fluid-conducting chamber 24. The cover plate 18 includes a central planar portion 20 that is generally rectangular in the illustrated embodiment. A sidewall flange 22 is provided around all four peripheral edges of the central planar portion 20. The sidewall flange 22 extends towards the base plate 14 providing a continuous sidewall about the fluid-conducting chamber 24 that is defined between the cover plate 18 and the base plate 14. An outwardly extending connecting flange 26 is provided along the base edge of the sidewall flange 22. The connecting flange 26 abuts against and is secured to a peripheral edge portion 27 of the base plate 14. In an example embodiment the cover plate 18 is of unitary construction and made of roll formed or stamped aluminum alloy that is braze clad.

A pair of fluid flow openings 28 and 30, one of which functions as a fluid inlet and the other of which is a fluid outlet, are provided near one end 60 of the heat exchanger 10 through the cover plate 18 in communication with the fluid-conducting chamber 24. In one example embodiment, the fluid flow openings 28 and 30 are located in raised inlet and outlet manifolds 29 and 31. Inlet and outlet fittings 32, 34 (see FIG. 2) having flow passages therethrough are, in an example embodiment, provided for openings 28, 30.

The base plate 14, in an example embodiment, is a flat plate having a first planar side that faces an inner side of the central planar portion 20 of the cover plate 18, and an opposite planar side that faces and is connected to the fin plate 12. The base plate 14 is substantially rectangular in the illustrated embodiment, having a footprint that is approximately the same as the footprint of the cover plate 18. Base plate 14 is, in a preferred embodiment, made from a braze clad aluminum or aluminum alloy sheet.

The fin plate 12 may take a number of different forms. In one example embodiment, the fin plate 12 is a unitary structure formed from extruded aluminum or aluminum alloy. The fin plate 12 includes a flat support wall 38 having a first planar side 40 facing and secured to the base plate 14, and an opposite facing side 42 on which is provided a plurality of elongate, parallel fins 44 that each run substantially from a first end to a second end of the support wall 38, and define a plurality of elongate passages 50 therebetween. The side of the fin plate 12 facing away from the base plate 14 is open such that alternating fins 44 and passages 50 are exposed so that, in use, air can flow through the passages 50 and over fins 44. In some applications, other substances such as water, snow and/or ice may be thrown against the exposed fins and passages. In some embodiments, fins 44 may be formed directly on an outer surface of the base plate 14—for example, the base plate 14 could be extruded with fins 44.

Figure 3:
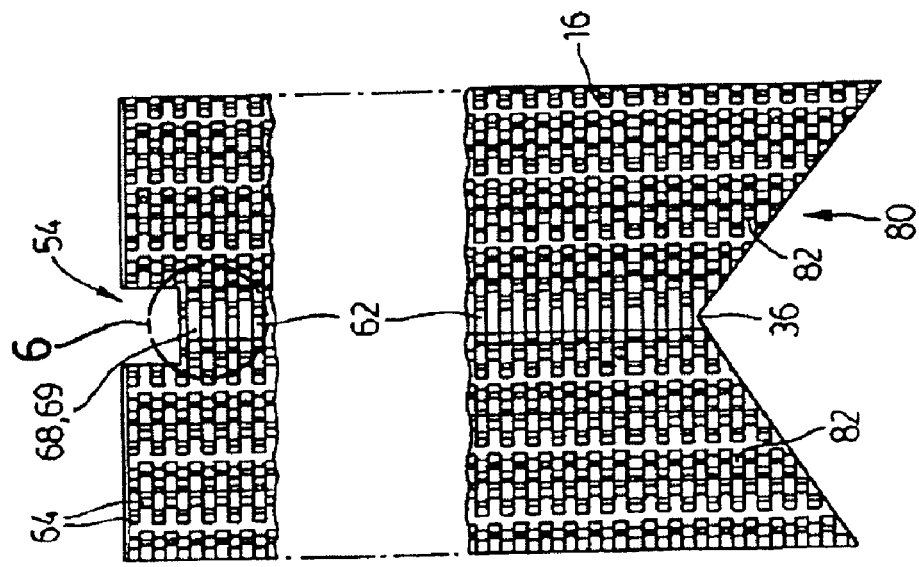
FIG. 3 is a plan view of a turbulizer plate of the heat exchanger of FIG. 1.
Figure 6:
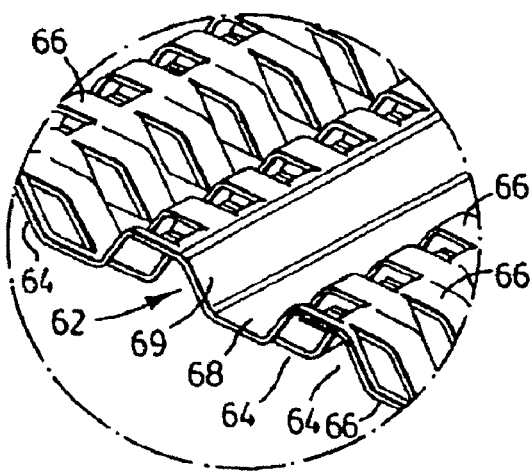
FIG. 6 is an enlarged perspective scrap view of the portion of FIG. 3 indicated by circle 6 in FIG. 3.

The turbulizer plate 16 is located in the fluid-conducting chamber 24 to augment fluid flow therein and thereby increase the efficiency of heat removal from the fluid. The turbulizer plate 16 also adds structural strength to the heat exchanger 10. With reference to FIGS. 3, 4, and 6, in example embodiments, the turbulizer plate 16 is formed of metal, namely aluminum, either by roll forming or a stamping operation. Staggered or offset transverse rows of convolutions 64 are provided on turbulizer plate 16. The convolutions have flat bases and tops 66 to provide good bonds with cover plate 18 and base plate 14, although they could have round tops, or be in a sine wave configuration, if desired. Part of one of the transverse rows of convolutions 64 is compressed or roll formed or crimped together to form transverse crimped portions 68 and 69 (crimped, as used herein, is intended to include crimping, stamping, roll forming or any other method of closing up the convolutions in the turbulizer plate 16). Crimped portions 68, 69 form a barrier 62 to reduce short-circuit flow inside the fluid-conducting chamber 24. The barrier 62 is represented by a line in FIG. 2, and runs from near the first end 60 of heat exchanger at which the fluid inlet and outlet manifolds 29, 31 are located to a termination point 36 that is spaced apart from the opposite second end 70 of the heat exchanger. The barrier 62 splits the flow chamber 24 into two adjacent or parallel flow regions 54, 56 that are connected by a transverse flow region 58 such that a substantial portion of the fluid flowing into the chamber 24 from opening 28 must flow through the turbulizer plate 16 in a U-shaped flow path around point 36, as indicated by arrows 74, prior to exiting the chamber 24 through opening 30 (in the case where opening 28 is the inlet and opening 30 is the outlet for chamber 24).

As best seen in FIGS. 2 and 3, the turbulizer plate 16 is dimensioned to substantially fill the entire fluid flow chamber 24 that is formed between the cover plate 18 and base plate 14, with the exception of a V-shaped notch 80 in the flow region 58 near the second end 70 of the heat exchanger. The notch 80 has its apex at or near the barrier termination point 36, and gets larger towards the second end 70. Such a configuration provides a V-shaped turbulizer free area near the second end 70 of the heat exchanger. The open area provided by notch 80 decreases flow restriction in the flow chamber 24 in the flow region 58 where fluid flows in a U-turn around the termination point 36 of barrier 62. The notch 80 is defined between two generally triangular portions 82 of the turbulizer plate 16 that extend from the barrier termination point 36 to the second end 70. The triangular portions 82 provide structural rigidity to the second end 70 area of the heat exchanger 10 as it limits the unsupported area near the end of the flow chamber 24. It will thus be appreciated that the provision of a V-shaped notch in the turbulizer plate 16 provides a configuration in which flow restriction (and thus pressure drop) around a fluid turning end of the flow chamber 24 can be controlled while at the same time maintaining the structural strength of the heat exchanger 10.

In various example embodiments, the notch 80 has a shape other than straight-sided-V. For example, FIGS. 8 and 9 show diagrammatic plan view representations of turbulizer plates 16 having alternative configurations. In FIG. 8, the notch 80 has a semi-circular (or curved "V") shape and is defined between two concave portions of the turbulizer plate 16. In FIG. 9, the notch 80 also has a curved V shape as defined between two convex portions of the turbulizer plate 16. In the various example embodiments, the turbulizer plate 16 includes support portions 82 that define the notch 80 and which have a decreasing size closer to the second end 70 of the flow chamber such that the volume of notch 80 increases from the barrier termination point 36 to the second end 70. The size and configuration of the notch 80 is, in example embodiments, selected to achieve an optimal combination of structural support, pressure drop control, and heat transfer surface area for the specific heat exchanger configuration and application. As indicated in FIG. 9, in some example embodiments the apex of notch 80 and the barrier termination location 36 are not at identical locations—for example, the notch apex could occur closer to the second end 70 of the fluid chamber than the barrier termination location 36. In some embodiments, a few dimples (not shown) may be formed on the cover plate 18 and/or base plate 14 for providing structural support between the two plates in the notch area.

Figure 7:
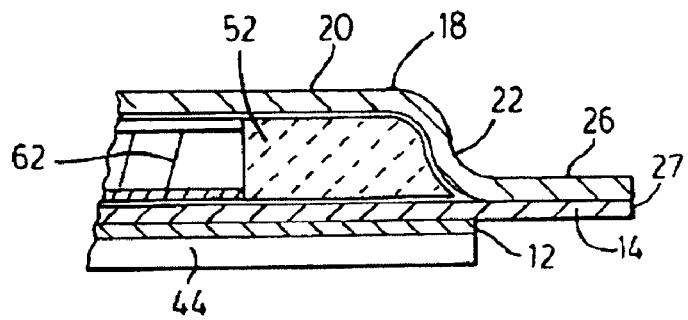
FIG. 7 is a partial sectional view taken along the lines VII—VII of FIG. 2.

In some example embodiments, the barrier 62 extends substantially to the first end 60 of the fluid chamber 24. However, in the example embodiment illustrated in the Figures, as best seen in FIGS. 2 and 3, a small notch 51 is provided at the turbulizer plate end that is located at the first end 60 of the fluid chamber 24. The turbulizer integral barrier 62 terminates at the notch 51. As best seen in FIGS. 2 and 7, a further barrier or baffle block 52 is located in the area provided by notch 51 in order to completely separate the inlet and outlet sides of the fluid chamber 24 at the inlet/outlet end 60 thereof. As noted above, the cover plate 18 includes a sidewall flange 22 that connects a central planar portion 20 to a lateral connecting flange 26. As best seen in FIG. 7, the internal transition areas between the central planar portion 20 to the sidewall flange 22, and from sidewall flange 22 to base plate 14, will generally be curved as it is quite difficult to form such corners to have exact 90 degree angles, especially when using roll formed or stamped metal. The baffle block 52 is dimensioned to fill the notch 51 and contour to the central portion 20, side wall 22 and base plate 14 and the transition areas therebetween to seal the small curved areas at the transition areas that may otherwise be difficult to block with the barrier 62 alone and which could otherwise provide short circuit flow paths between the inlet and outlet openings of the heat exchanger 10. Baffle block 52 is in an example embodiment formed from aluminum or aluminum alloy that is stamped into the appropriate shape, however other materials and forming methods could be used to produce the baffle block 52.

In an example embodiment, the cover plate 18 and the base plate 14 and the baffle block 52 are formed from braze clad aluminum, and the heat exchanger 10 is constructed by assembling the parts in the order shown in FIG. 1, clamping the parts together and applying heat to the assembled components in a brazing oven, thereby sealably brazing the cover plate side connecting flange 26 to the base plate 14 with the turbulizer plate 16 and baffle block 52 sandwiched between the cover plate 18 and base plate 14, and brazing the base plate 14 to the support wall 38 of the fin plate 12. Soldering, welding or adhesives could, in some applications, be used in place of brazing for connecting the components together.

Figure 10:
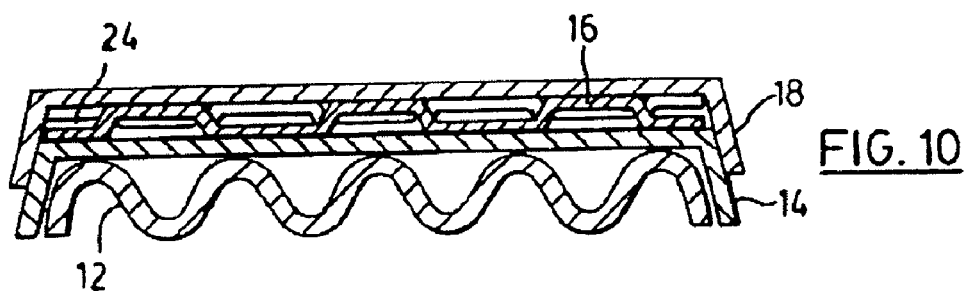
FIGS. 10, 11 and 12 are each sectional views, similar to FIG. 4, showing alternative configurations for cover and base plates of a heat exchanger according to embodiments of the invention.
Figure 11:
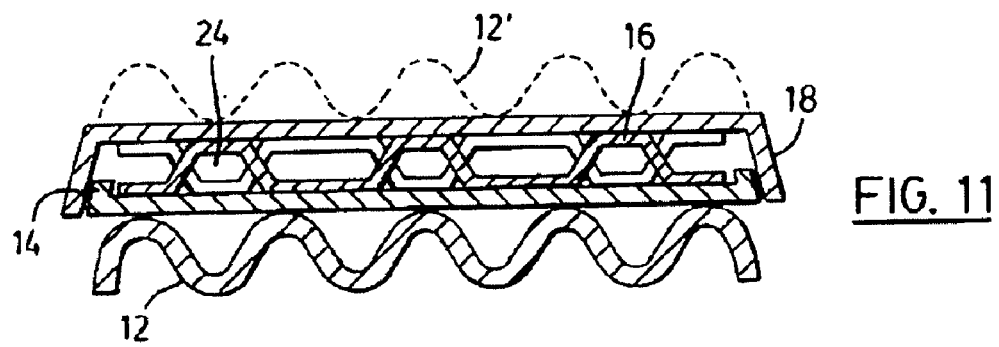
Figure 12:
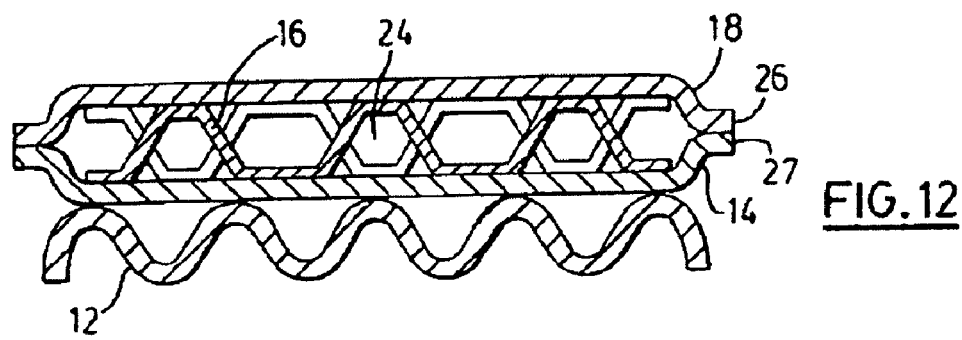

The cover and base plates 18, 14, as well as fin plate 12, could have configurations other than as described above. By way of example, FIGS. 10, 11 and 12 are sectional views showing different configurations of cover and base plates 18, 14 according to other example embodiments of the invention. In each of FIGS. 10, 11 and 12, the cover and base plates 18, 14 define between them closed fluid chamber 24 in which turbulizer plate 16 having a central notch 80 (not shown in FIGS. 10, 11 and 12) is located. In the embodiment of FIG. 10, the cover plate 18 is dish shaped, having a central planar portion with an integral, peripheral, downwardly extending flange that defines an angle of slightly greater than 90 degrees with respect to an inner surface of central planar portion. The base plate 14 is substantially identical, except that it does not have inlet openings formed therethrough, and the downwardly extending flange of the base plate 14 is nested within the flange of the cover plate 18. The fin plate 12 (which is a plate with sinusoidal corrugations in FIG. 10) is secured to a lower surface of the base plate 14.

FIG. 11 shows a similar configuration, except that the base plate 14 has an upwardly turned peripheral flange that extends in the opposite direction of the cover plate flange, and which has an outer surface that is nested within and brazed to an inner surface of cover plate flange. The configurations shown in FIGS. 10 and 11 could be easily "flipped over" with the fin plate being placed on the opposite side, as shown by phantom line 12' in FIG. 11. Furthermore, in some embodiments, fin plates may be used on both sides of the heat exchanger.

FIG. 12 shows a further configuration in which the cover plate 18 and base plate 14 are identical (except that there are no flow openings in the base plate), each having an abutting flange 26, 27 formed about a central planar portion thereof.

Figure 5:
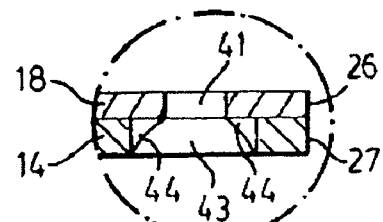
FIG. 5 is an enlarged scrap view of the portion of FIG. 4 indicated by circle 5 in FIG. 4.
Figure 13:
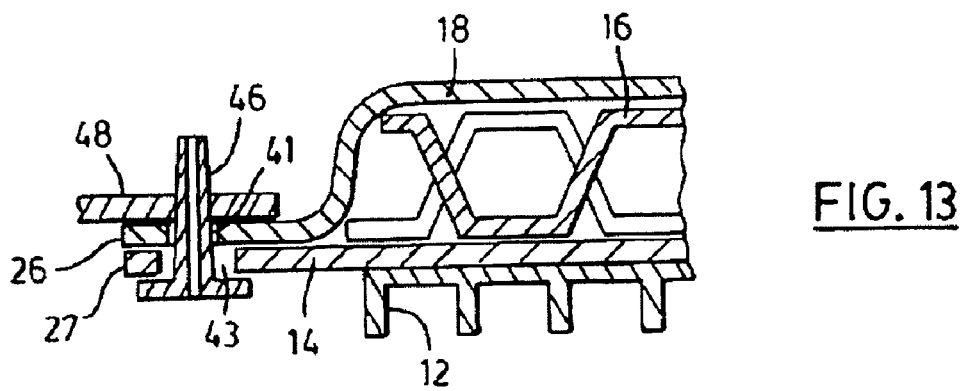
FIG. 13 is a partial sectional view showing a rivet passing through aligned mounting holes of a heat exchanger according to embodiments of the invention.
Figure 14A:
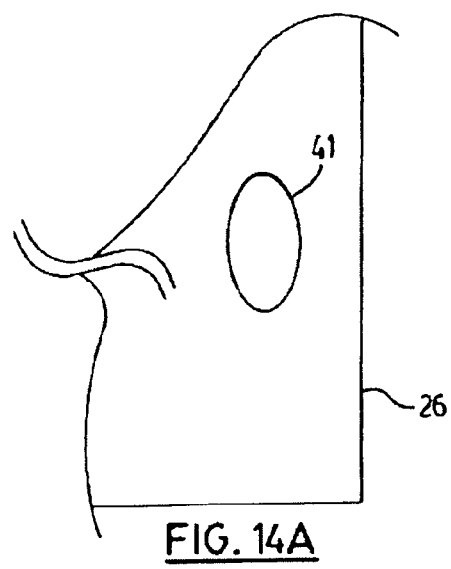
FIGS. 14A–14D show partial plan views of a heat exchanger illustrating alternative mounting hole configurations.
Figure 14B:
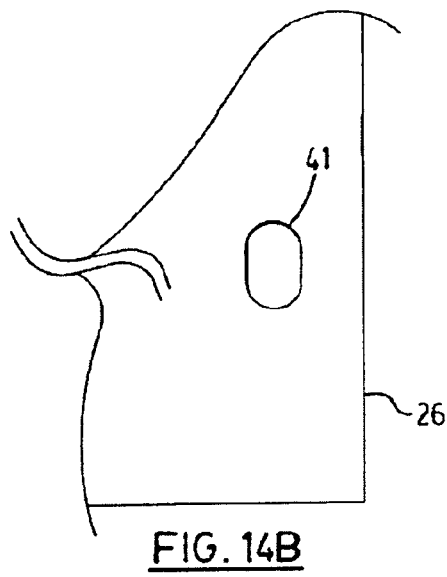
Figure 14C:
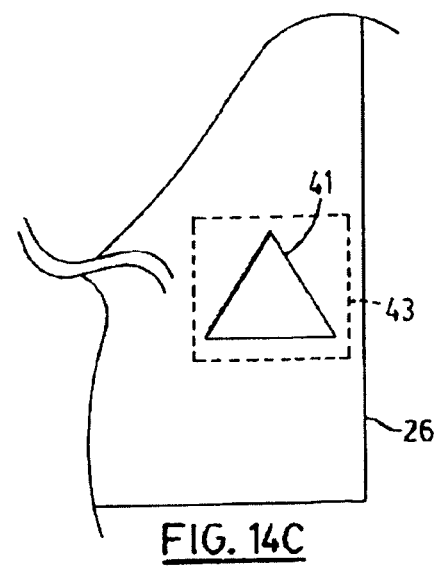
Figure 14D:
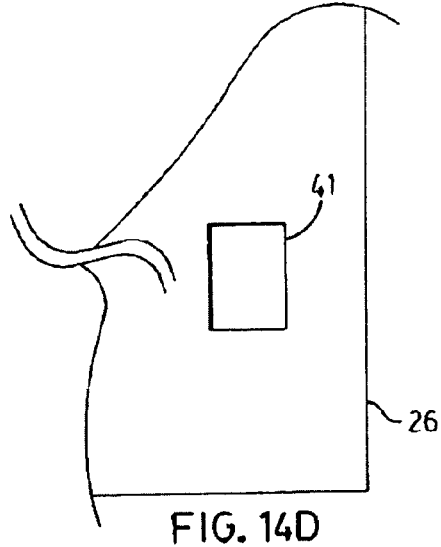

Referring again to the embodiment of FIG. 1, as described above, the cover plate 18 of such embodiment includes a connecting flange 26 that abuts against and is secured to an edge portion 27 of the base plate 14. The connecting flange 26 and edge portion 27 collectively provide a mounting flange for mounting the heat exchanger to the chassis of a vehicle, and in an example embodiment, a series of annular openings or holes 41 and 43 are provided through the connecting flange 26 and edge portion 27, respectively. The openings 41 and 43 may be punched or otherwise formed through the connecting flange 26, and edge portion 27, respectively. When the heat exchanger 10 is assembled, each opening 41 through the connecting flange 26 is aligned with a corresponding opening 43 through the edge portion 27, as best seen in FIG. 5. Each pair of aligned openings 41, 43 provides an opening through the mounting flange of the heat exchanger 10 suitable for receiving a mounting fastener such as a rivet or bolt so that the heat exchanger can be secured to a vehicle chassis. For example, FIG. 13 is a partial sectional view showing a not yet compressed rivet 46 passing through an aligned pair of cover and base plate openings 43, 41 and through a further opening provided in a vehicle chassis 48. As seen in FIGS. 5 and 13, the opening 41 through the cover plate connecting flange 26 is smaller than the opening 43 through the base plate edge portion 27. In one example embodiment, both of the openings 41 and 43 are circular, with the opening 41 having a smaller diameter than the opening 43. However, other shaped holes can be used in other example embodiments—for example, as shown in FIGS. 14A–14D one or both of the openings could be oval (FIG. 14A), elliptical (FIG. 14B), triangular (FIG. 14C) or rectangular (FIG. 14D), or square, or star shaped, or other multi-sided shape, among other shapes, so long as one of the openings 41, 43 in each aligned pair is larger than the other. When aligned, the openings of a pair may not be in exact concentric alignment, however in an example embodiment, the perimeter or circumference of the smaller opening does not overlap the perimeter of the larger opening. Thus, the effective diameter or size of the resulting opening formed by the aligned pair of openings is substantially equal to that of the smaller opening 41. In some embodiments, the cover plate openings 41 may be larger rather than smaller than the base plate openings 43 for all or some of the aligned pairs. In some embodiments, the smaller and larger openings in a pair could have different shapes, for example a small circular opening used in combination with a larger elliptical opening, or, as shown in FIG. 14C, a triangle shaped opening 41 used in combination with a square shaped opening 43. In some example embodiments where circular openings are used for receiving a mounting rivet or bolt, the smaller opening has a diameter of between 5 and 6 mm and the larger opening has a diameter that is between 7 and 8 mm, although it will be understood that such dimensions and percentages are provided as non-limiting examples only as opening size will be affected by, among other things, plate thickness and the desired use of the aligned openings. In one example embodiment the difference in opening sizes is selected so that if the smaller opening and large opening are in concentric alignment, the minimum distance between the edge of the larger opening and the edge of the smaller opening will be at least equal to the thickness of the plate with the larger opening.

The use of different sized aligned openings 41, 43 provides an improved degree of manufacturing tolerance than would be provided by openings having a common size, especially when braze-clad (or braze-filler metal coated) plates 14 and 18 are used to make the heat exchanger 10. For example, even if the openings 41, 43 of a pair are slightly misaligned, as long as the misalignment does not exceed the amount by which the larger hole exceeds the size of the smaller hole, the resulting mounting hole formed by the aligned pair will still have the same effective diameter (ie. that of the smaller opening). Additionally, as shown in FIG. 5, the brazing process often results in the formation of fillets 44 of cladding material. In aligned holes of the same size, the fillet material can partially block the resulting mounting hole. However, as can be seen in FIG. 5, when openings of different sizes are used, the larger circumference of the larger opening 43 draws the fillet or clad material back from the area of the smaller opening 41 such that the fillet 44 does not obstruct the smaller opening 41. Thus, the use of aligned openings of different sizes allows the final mounting hole size to be controlled with a greater degree of predictability and with looser manufacturing tolerance than would be required if openings of the same size through adjacent plates were aligned together. Thus, the use of different sized openings addresses the problem of trying to fit a pin-like device through a hole, where the hole is made from a lap joint of 2 or more layers, and where the pin has a close outer diameter to that of the nominal hole inside diameter. During brazing of a conventional lap joint containing identical holes, the hole edges provide a capillary drawing force on the molten filler metal, tending to draw the filler metal into the hole. Not only does the filler metal partially block the hole, but its location within the hole is unpredictable, and thus difficult to compensate for by conventional means. Also, when the holes are identical in size and they are slightly misaligned, this actually compounds the problem by increasing the capillary effects involved. The use of different sized holes in a lap joint helps to alleviate such problems.

Although the use of two different sized aligned holes has been described above in a specific heat exchanger configuration, different sized aligned openings can be used in any application in which two different plates or sheets having respective openings therethrough are brazed together with the openings in alignment. Although the aligned openings have been described above as mounting openings, the openings could be provided for other reasons, such as for allowing a protrusion or wire to pass through the aligned openings of plates 14, 18, or to accept a bolt or other fastener for connecting the plates 14, 18 to another device in other than a mounting capacity. The openings could be also provided through metal plate portions used as heat exchanger mounting brackets.

The heat exchanger 10 can conveniently be used as a low-profile device for cooling a fluid that passes through the fluid flow container defined by the cover plate 18 and base plate 14, with heat from fluid being conducted away from the fluid to exposed fins 44, which in turn are cooled by air passing there through. In some applications, the cooling of exposed fins 44 is assisted by other substances such as snow and water that gets thrown against the exposed fins 44. The heat exchanger 10 can be used, for example, as an engine coolant cooler in a snowmobile, or as an underbody mounted fuel cooler in an automotive application, although these examples are not exhaustive.

Although the heat exchanger 10 described above is a two-pass heat exchanger, aspects of the present invention could also be applied to heat exchangers having more than two-passes. By way of example, FIG. 15 shows a plan view of a four-pass heat exchanger, indicated generally by reference 100, and FIG. 16 shows a plan view of a three-pass heat exchanger, indicated generally by reference 110, according to further example embodiments of the invention. Heat exchangers 100 and 110 are similar in construction and function to heat exchanger 10 with the exception of differences that will be apparent from the Figures and the present description. In both FIGS. 15 and 16, the turbulizer plate 16 is indicated in dashed lines.

With reference to the four-pass heat exchanger 100 of FIG. 15, the turbulizer plate 16 includes three internal barriers 62, 62A and 62B formed by crimped lines of convolutions in the turbulizer plate. Barriers 62 and 62B each extend from substantially the first end 60 of the fluid chamber 24 to termination locations 36 and 36B, respectively, which are spaced apart from the second end 70. Barrier 62A extends from substantially the second end 70 of the fluid chamber 24 to a termination location 36A spaced apart from the first end 60. The three barriers 62, 62A and 62B divide the heat exchanger fluid chamber 24 into four side-by-side connected flow regions through which fluid flows back and forth in a serpentine manner in the direction indicated by arrows 74. In order to reduce flow restriction at the regions in the flow chamber 24 at which fluid must pass around a bend, V-shaped notches 80, 80A and 80B are provided in the end areas of turbulizer plate 16 at the regions where the fluid is forced to turn around the barriers 62, 62A and 62B, respectively.

With reference to the three-pass heat exchanger 110 of FIG. 16, the turbulizer plate 16 includes two internal barriers 62 and 62A formed by crimped lines of convolutions in the turbulizer plate. Barrier 62 extends from substantially the first end 60 of the fluid chamber 24 to termination locations 36 which is spaced apart from the second end 70. Barrier 62A extends from substantially the second end 70 of the fluid chamber 24 to a termination location 36A spaced apart from the first end 60. The two barriers 62 and 62A divide the heat exchanger fluid chamber 24 into three side-by-side connected flow regions through which fluid flows back and forth in the direction indicated by arrows 74. In order to reduce flow restriction at the regions in the flow chamber 24 at which fluid must pass around a bend, V-shaped notches 80 and 80B are provided in the end areas of turbulizer plate 16 at the regions where the fluid is forced to turn around the barriers 62 and 62A, respectively. Although not shown in FIGS. 15 and 16, barrier or baffle blocks 52 could be used at the sealing ends of each of the baffles 62, 62A and 62B to reduce the chance of short circuiting at such ends.

FIG. 17 shows yet a further heat exchanger, indicated generally by reference 120, according to other embodiments of the invention. Heat exchanger 120 is a two-pass substantially identical to heat exchanger 10, except that the heat exchanger 120 has a trapezoidal rather than rectangular configuration.

Many components of the heat exchanger of the present invention have been described as being made from aluminum or aluminum alloy, however it will be appreciated that other metals could suitably be used to form the components, and in some applications non-metallic materials might be used, including for example thermally bondable, ultrasonically bondable, and adhesive bondable polymers. As will be apparent to those skilled in the art, many alterations and modifications are possible in the practice of this invention without departing from the spirit or scope thereof. Accordingly, the scope of the invention is to be construed in accordance with the substance defined by the following claims.

What is claimed is:

1. A plate pair for use in a heat exchanger, said plate pair comprising:
 a first plate having a first substantially planar central portion surrounded by a first peripheral edge portion, the peripheral edge portion including a substantially planar peripheral flange section having a first opening formed therein;
 a second plate having a second substantially planar central portion spaced-apart from said first central portion and surrounded by a second peripheral edge portion having a second opening formed therein, one of the first and second openings being larger than the other of the first and second openings; and
 braze material securing the peripheral flange section to the second peripheral edge portion of the second plate with the first and second openings in substantial alignment with each other, wherein the substantially aligned first and second openings form a mounting opening for receiving a fastener for mounting said heat exchanger.

2. The plate pair of claim 1 wherein a perimeter of the first opening does not overlap with a perimeter of the second opening.

3. The plate pair of claim 1 wherein at least the first opening is circular.

4. The plate pair of claim 3 wherein the mounting opening formed by the aligned first and second openings has an effective diameter equal to that of the first opening.

5. The plate pair of claim 1 wherein at least one of the first and second openings is oval.

6. The plate pair of claim 1 wherein at least one of the first and second openings is elliptical.

7. The plate pair of claim 1 wherein at least one of the first and second openings is triangular.

8. The plate pair of claim 1 wherein at least one of the first and second openings is rectangular.

9. The plate pair of claim 1 wherein the first opening and the second opening each have a different shape.

10. The plate pair of claim 1 wherein at least one of the first and second openings is multi-sided.

11. The plate pair of claim 1 wherein the first opening and the second opening are not concentric.

12. The plate pair of claim 1 including a fastener having a shaft passing through the openings.

13. The plate pair of claim 1 wherein the plate pair forms a heat exchanger and a fluid flow chamber having inlet and outlet openings is defined between the spaced apart central portions.

14. The plate pair of claim 13 wherein a plurality of first openings are formed through the first plate flange section and a plurality of the second openings are formed through the second plate edge portion in alignment with corresponding ones of the first openings, forming a plurality of mounting openings.

15. A method for forming a plate pair for use in a heat exchanger, said method comprising:

(a) providing a first plate having a substantially planar central portion surrounded by a first peripheral edge portion, the peripheral edge portion including a substantially planar peripheral flange section having a first opening formed therein;

(b) providing a second plate having a second peripheral edge portion having a second opening through said second edge portion, one of the first and second openings being larger than the other of the first and second openings, at least one of the first plate and second plate being covered with a brazing material; and (c) oven brazing the first plate and the second plate together with the first plate peripheral flange section abutting against the second peripheral edge portion and the first and second openings substantially in alignment with each other; the substantially aligned first and second openings together forming a mounting opening for receiving a fastener for mounting said heat exchanger.

16. The method of claim 15 wherein a perimeter of the first opening does not overlap with a perimeter of the second opening.

17. The method of claim 15 wherein the mounting opening has an effective diameter equal to that of the first opening.

18. The method of claim 15 wherein the first and second openings are substantially the same shape, the shape being selected from the group consisting of circular, oval, elliptical, triangular and rectangular.

19. The method of claim 15 wherein the first opening and second opening are dimensioned such that the minimum distance between a perimeter of the second opening and a perimeter of the first opening is at least equal to the thickness of the second plate.

20. The method of claim 15 including forming at least one of the first and second plates by stamping, and forming the first opening and the second opening by punching through the first and second plates, respectively.

21. A plate pair for use in a heat exchanger, said plate pair comprising:

a first plate having a first opening through a first plate portion thereof;

a second plate having a second opening through a second plate portion thereof, the second opening being larger than the first opening; and braze material securing the first plate portion to the second plate portion with the first and second openings being in substantial alignment with each other and together forming a fastener opening for receiving a fastener for mounting purposes.

22. A plate pair according to claim 21 including a fastener having a shaft passing through said fastener opening.

23. A heat exchanger apparatus comprising a heat exchanging device including:

a first plate having a first opening;

a second plate having a second opening, the first and second plates having substantially planar spaced apart central portions that are surrounded by peripheral edge portions, the peripheral edge portion of one of said first and second plates including a substantially planar peripheral flange section that is brazed by braze material to the peripheral edge portion of the other of said first and second plates, said first and second openings being formed respectively in said peripheral flange section and the peripheral edge portion brazed thereto and being in substantial alignment with each other, one of said first and second openings being larger than the other of said first and second openings;

a fluid flow chamber having inlet and outlet openings being defined between the spaced apart central portions; and a fastener having a shaft passing through said first and second openings.

* * * * *